United States Patent
Bankowski et al.

(10) Patent No.: US 9,915,541 B2
(45) Date of Patent: Mar. 13, 2018

(54) METHOD AND APPARATUS FOR DYNAMIC DESTINATION ARRIVAL TIME UPDATING

(71) Applicant: Ford Global Technologies, LLC, Dearborn, MI (US)

(72) Inventors: Stefan Bankowski, Royal Oak, MI (US); Edward Wehrman, Leesburg, VA (US); Elizabeth Halash, Warren, MI (US); Kevin Burdette, Plymouth, MI (US); Heath Williams, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 14/529,814

(22) Filed: Oct. 31, 2014

(65) Prior Publication Data
US 2016/0123753 A1    May 5, 2016

(51) Int. Cl.
*G01C 21/34* (2006.01)

(52) U.S. Cl.
CPC ............... *G01C 21/3469* (2013.01)

(58) Field of Classification Search
CPC ..... G01C 21/34; G01C 21/3492; G08G 1/123
See application file for complete search history.

(56) References Cited

U.S. PATENT DOCUMENTS

| | | | | |
|---|---|---|---|---|
| 8,442,758 | B1 * | 5/2013 | Rovik | G06Q 10/109 701/424 |
| 8,892,359 | B2 * | 11/2014 | Wippler | G01C 21/3611 701/104 |
| 2009/0157289 | A1 * | 6/2009 | Graessley | 701/123 |
| 2009/0319172 | A1 | 12/2009 | Almeida et al. | |
| 2011/0306366 | A1 | 12/2011 | Trussel et al. | |
| 2012/0197523 | A1 * | 8/2012 | Kirsch | 701/426 |
| 2012/0226440 | A1 * | 9/2012 | Nagda | G08G 1/202 701/465 |
| 2012/0230484 | A1 | 9/2012 | Kannappan et al. | |
| 2013/0080537 | A1 | 3/2013 | Protopapas et al. | |
| 2014/0200804 | A1 * | 7/2014 | Wippler | G01C 21/3697 701/465 |
| 2014/0244143 | A1 * | 8/2014 | Elwart et al. | 701/117 |
| 2014/0368329 | A1 * | 12/2014 | Brown et al. | 340/468 |

\* cited by examiner

*Primary Examiner* — Jerrah Edwards
*Assistant Examiner* — Kelly D Williams
(74) *Attorney, Agent, or Firm* — Jennifer Stec; Brooks Kushman P.C.

(57) ABSTRACT

A system includes a processor configured to receive vehicle information including at least location and fuel level. The processor is also configured to determine a current estimated time-of-arrival (ETA) to an event-associated destination based on travel time from the location. The processor is further configured to determine a fuel-level impact on the current ETA. Also, the processor is configured to provide a remote party update, including the current ETA, responsive to the current ETA deviating from a previous ETA by more than a threshold deviance.

19 Claims, 5 Drawing Sheets

METHOD AND APPARATUS FOR DYNAMIC DESTINATION ARRIVAL TIME UPDATING

TECHNICAL FIELD

The illustrative embodiments generally relate to a method and apparatus for dynamic destination arrival time updating.

BACKGROUND

Because we live in a highly connected, on-demand world, there is a great deal of desire for immediate access to information change. Communication platforms provide for near instantaneous accessibility to remote parties, regardless of time of day or location. As a result, expectations with regard to punctuality and/or changes in expected arrival times have risen significantly. While it used to be common (in a pre-mobile device area) to set an expected arrival time, and then, if traffic was encountered, simply to arrive as soon as possible, the on-demand nature of communication dictates that now the driver should call/text/email other parties to let them know about changes in plans. Unfortunately, the driver may not always have perfect information about the road ahead to provide such updates.

SUMMARY

In a first illustrative embodiment, a system includes a processor configured to receive vehicle information including at least location and fuel level. The processor is also configured to determine a current estimated time-of-arrival (ETA) to an event-associated destination based on travel time from the location. The processor is further configured to determine a fuel-level impact on the current ETA. Also, the processor is configured to provide a remote party update, including the current ETA, responsive to the current ETA deviating from a previous ETA by more than a threshold deviance.

In a second illustrative embodiment, a computer-implemented method includes receiving vehicle information including at least location and fuel level. The method also includes determining a current estimated time-of-arrival (ETA) to an event-associated destination based on travel time from the location. The method further includes determining a fuel-level impact on the current ETA and providing a remote party update, including the current ETA, responsive to deviance of the current ETA from a previous ETA exceeding a deviance threshold.

In a third illustrative embodiment, a non-transitory storage medium stores instructions that, when executed, cause a processor to perform a method that includes receiving vehicle information including at least location and fuel level. The method also includes determining a current estimated time-of-arrival (ETA) to an event-associated destination based on travel time from the location. The method further includes determining a fuel-level impact on the current ETA and providing a remote party update, including the current ETA, responsive to deviance of the current ETA from a previous ETA exceeding a deviance threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
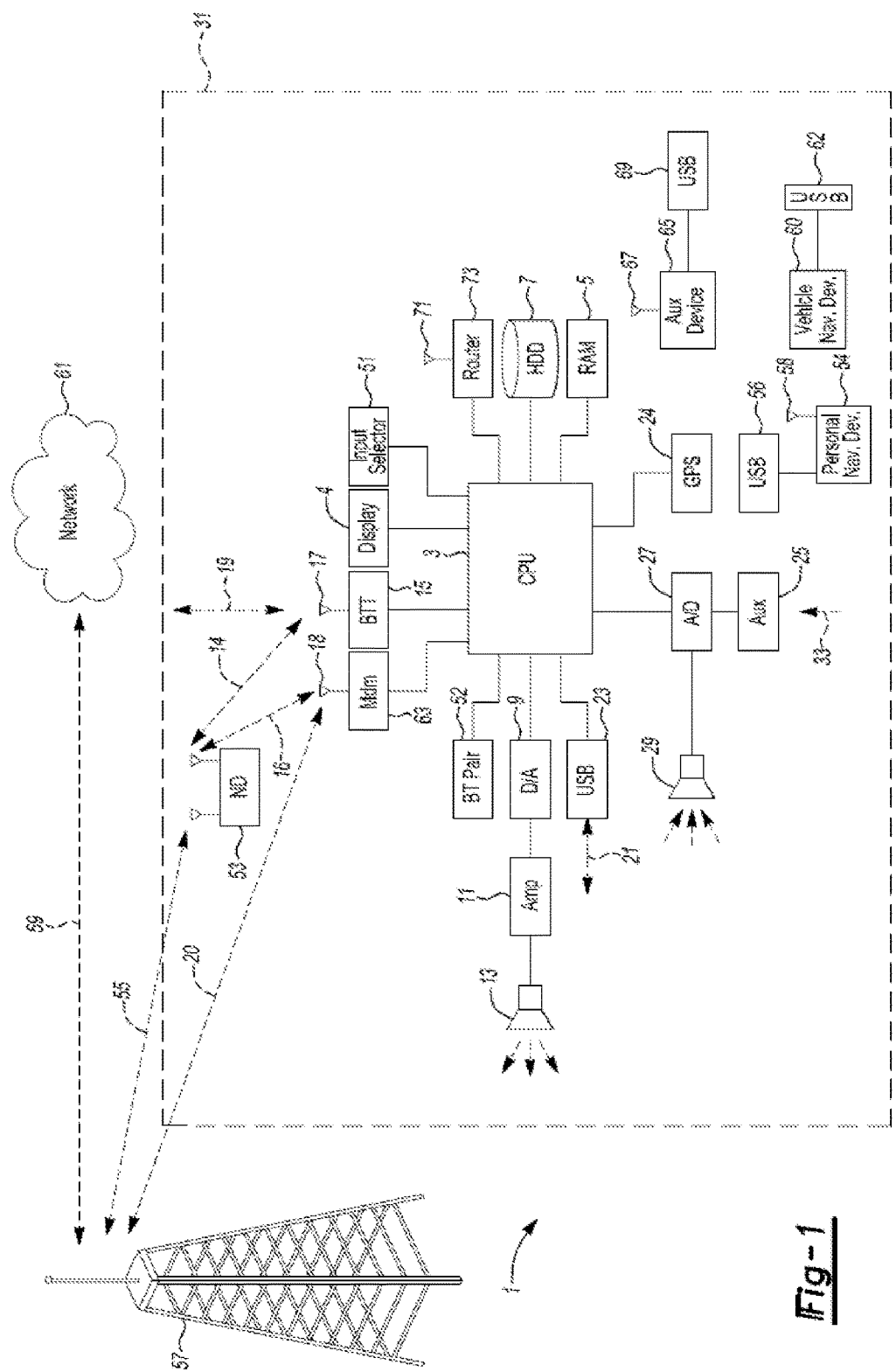
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

In the illustrative embodiments, processes running on, for example, a mobile device, a vehicle computing system or in the cloud (and connected to the vehicle computing system) provide for dynamic, real time updates of a user's ETA. Instead of having the driver have to manually access a calendar or social media account where an event is listed and manually update an ETA, the processes allow for automatic ETA updates that accurately reflect true ETA based on currently known conditions (e.g., without limitation, current location and speed, traffic, weather, fuel levels, etc.).

Once launched by a user, an application can persist in execution in the background, and access a vehicle computer over multiple ignition cycles. The application has access to vehicle data usable to determine a current ETA, and has access to social media, calendar and other scheduling formats for use in event determination and ETA updates.

As the vehicle travels, the process can utilize vehicle data to determine a current ETA. If there is sufficient deviance from a projected ETA, then, at the request of the user and/or over periodic intervals, the application can update a destination-related event posting to reflect the new ETA for the user. The event could be listed in a user calendar application or could be present on a social media account, for example.

Figure 2:
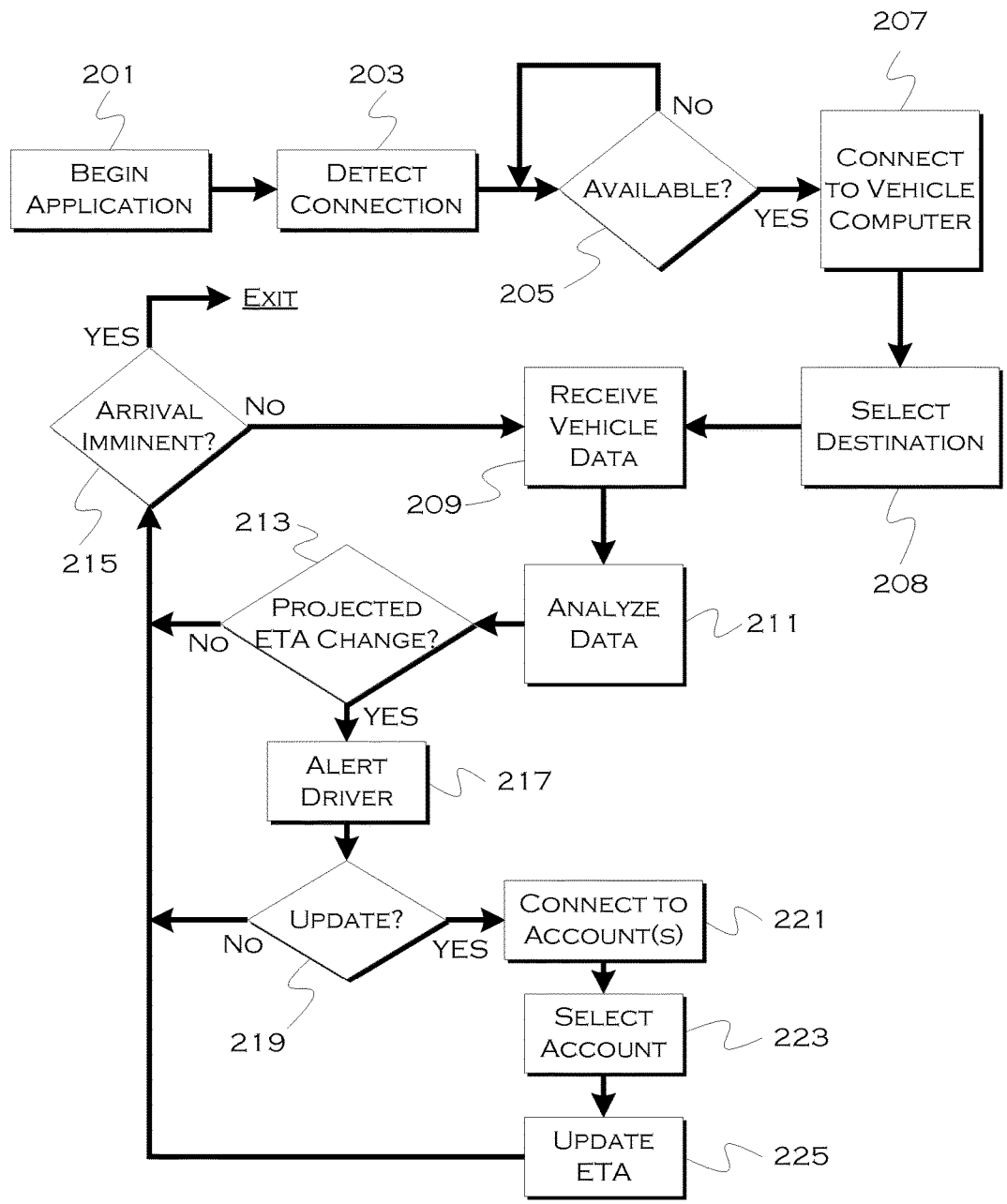
FIG. 2 shows an illustrative estimated time of arrival (ETA) update process.

FIG. 2 shows an illustrative estimated time of arrival (ETA) update process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative example shown in FIG. 2, a user launches an ETA estimation and update application 201. While shown as a single process, it is understood that the methods and apparatuses discussed herein could be embodied in multiple processes being performed at varied locations as is appropriate for a given implementation. Further, all processes shown herein are merely illustrative and are not intended to limit the scope of the invention in any manner.

Once the process is running, it will detect a connection with a vehicle computing system. Information, such as speed, GPS data and fuel level, for example, will be received from a vehicle computer. While GPS data and speed data could be calculated by a mobile device itself, vehicle-specific information may still need to come from the vehicle directly, if used in the ETA prediction. In at least one example, a fuel level is considered to determine an anticipated affect on ETA, and the fuel level is provided by a vehicle computing system, in that example. Once the vehicle computing system is available 205, the process can connect using the appropriate connection (e.g., without limitation WiFi, BLUETOOTH, etc.) 207.

Once a connection to the vehicle computer is established, the process can choose a destination for ETA consideration 208. More with respect to illustrative destination consideration is discussed with respect to FIGS. 4 and 5. Generally, the destination can be a present destination or a destination relating to an upcoming calendar or social media tracked event. In at least one example, the driver could input a specific destination for purposes of ETA consideration, even if a different destination was presently being used by a navigation system.

In the illustrative process, vehicle data is next received from the vehicle computing system. A specific example of vehicle data receipt is shown with respect to FIG. 3, but generally this data is data that can be used to determine the likely ETA of a traveling vehicle. The vehicle data is analyzed to determine a likely ETA 211. This can include, but is not limited to, estimating arrival time based on present speed, location, upcoming traffic, weather and any possible predictable stops, such as a refueling stop if the vehicle fuel state is or is projected to be below a tunable threshold level.

With regards to stopping points relating to things such as fuel state, a fixed level (e.g., 10%, 20 miles remaining, etc.) may be used as a threshold for when a stop is likely, and/or the level may be determined by observed user behavior (e.g., the user always stops at 20% remaining, 40 miles remaining, etc.). In one model, the prediction may be made first at the user tunable level and then reinforced if a lower threshold minimum safety level is reached (raising the likelihood of a stop from possible to an almost certainty).

If the projected ETA is greater than a threshold different from a previously estimated ETA (or if a first time ETA calculation is made) 213, the process may alert the driver to the expected change 217. This could be a positive or a negative change, but in this example the driver is given the option to confirm any ETA updates.

In another example, the driver may only confirm the updates once and then they may progress as appropriate during the trip, or, in still another example, the driver may simply instruct or activate updates and the updates will automatically post once a tunable threshold is crossed.

The threshold for ETA updates can vary based on driver preferences and it can be tunable, for example, based on proximity (temporal or physical) to a destination. That is, if a user is more than 50 miles or 1 hour away (illustrative numbers only), the process may provide updates only if the ETA changes by more than 5 minutes. Once the vehicle is 25 miles or 0.5 hours away, the updates may be based on 3 minute changes. When the vehicle is within 5 miles and/or 10 minutes, the ETA updates can be based on minute by minute or fractional minute changes. In another example, the ETA threshold for updates changes as the event approaches, such that smaller updates of time are used closer and closer to the start of the event, so that arriving parties know with greater accuracy when other parties are likely to arrive. In at least one example, if the update process utilizes an ETA threshold likely to result in multiple ETA changes every few minutes, the driver alert process is disabled so as not to unduly distract the driver, and the updates are simply made.

Once the driver has confirmed the ETA update 219, the process proceeds to connect to an account where event data is stored 221 (or to contact event attendees, if preferred) and select the appropriate event for updating 223. A driver ETA is then updated with respect to the selected event 225. Information such as the possible need for a gas/charge stop could also be posted, and then, if a gas stop is observed, the system could also update accordingly.

So, for example, the process may begin when a driver starts a journey. A review of the driver's upcoming events on Facebook reveals that the driver has confirmed attendance of a company dinner at 5:00 PM. The driver is presently thirty miles from the destination associated with the dinner. The current time is 4:00 PM, and an initial ETA is 4:45, which is posted to Facebook with the driver's permission, via the illustrative update process.

As the driver travels, an accident combined with rush-hour traffic slows down the driver, and the system calculates a new ETA of 4:57 PM. Since, in this example, the tunable threshold for updates is, for example, three minutes, the twelve minute variance is outside the threshold and the driver is given an option to update the ETA. Because the driver wants co-workers to know when the driver will arrive, the driver confirms ETA updates and instructs the system to automatically update the system. In this example, the driver is provided with an option of ETA variance at this point as well, and the driver instructs updates of ETA variance over five minutes.

Traffic continues at the slow crawl, and the next ETA calculation has the driver arriving at 5:00 PM. Since this is not outside the five minute threshold, no update is made. At the next ETA calculation (these can be made at periodic intervals or in an ongoing calculation), the accident has been cleared and traffic has resumed the speed limit. Accordingly, the driver's new projected arrival time is 4:54 PM. Although this is more than five minutes from the previous calculation, the previous calculation didn't result in an update, so the basis for the ETA comparison in this example is the previously posted update of 4:57. Again, since the change is not outside the five minute threshold, the process does not update the ETA.

While traveling surface roads, the driver hits a streak of lights that are all green, and the ETA improves to 4:51 PM. Since this is outside the five minute threshold, the process may update the ETA at this point. This sort of updating can continue up until the driver reaches the destination (or is within a tunable proximity to the destination), as desired.

The ETA variance threshold used for updates can also be tuned based on a type of update. For example, without limitation, if text or email updates are used to update an ETA, a larger threshold may be used, to avoid a stream of slight variation texts. If the time is merely updated at an accessible source, however, the process may use a lower variance, because the process won't be unnecessarily cluttering an inbox.

Figure 3:
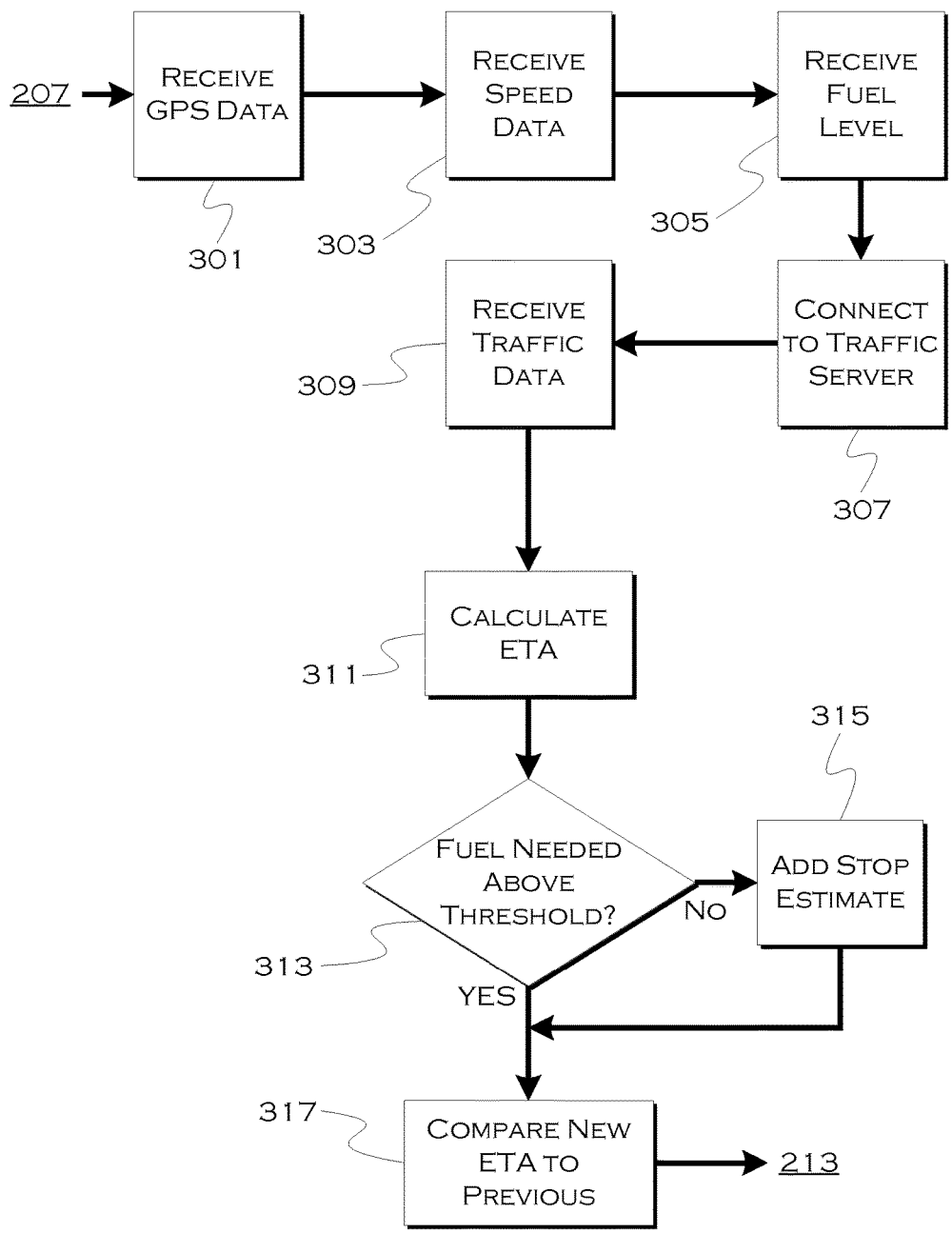
FIG. 3 shows an illustrative ETA calculation process.

FIG. 3 shows an illustrative ETA calculation process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative process, non-limiting examples of vehicle data and ETA calculations are shown. From the vehicle (in this case), the process receives GPS data 301 (e.g., vehicle location), vehicle speed data 303, and vehicle fuel/power level data 305. In this example, a destination for which ETA is to be calculated is already known.

Also, in this example, the process is capable of receiving traffic data (and also weather data, if useful), which can be used to determine the effect of traffic on ETA. In this example, the process connects to a remote traffic/weather server 307 and receives the data 309 therefrom. If the traffic and/or weather data was already provided to the device or vehicle for use by another application, the data could be retrieved directly from one of those sources, as an alternative.

Based on the received and gathered data, a new ETA is calculated 311. Also, in this example, the process determines if the fuel/power needed to reach the destination leaves a remaining amount above a predetermined threshold 313. As previously noted, this threshold could be fixed or variable, and could be predetermined or user-dependent. If the remaining fuel/power is likely to be below the threshold 313, the process will add an estimated refueling/recharging stop time to the ETA for calculation purposes 315. This could be a secondary calculation (e.g., a second ETA if a stop is made), or, based on, for example, a likelihood of stopping, could automatically be added to a single ETA calculation. The new ETA(s) are compared against the previously updated ETA (if present) and the process can then continue as in exemplary step 213, for example.

In the previously presented illustrative driver example, if the driver heading to the work-dinner had 25% fuel remaining when the journey began, and the trip to the dinner was estimated to use 7% of the total possible fuel (meaning 18% remaining), the process might update the ETA with a secondary ETA of seven minutes later with an indicator that that ETA is based on a fuel stop. The driver could also be asked to confirm if fuel would or would not be obtained, and this data could be used to verify the primary or secondary ETA. If there was only 8% fuel remaining at the beginning of the journey, and the driver was projected to use 7%, the system may elect to automatically include a fuel stop in any ETA calculations.

Figure 4:
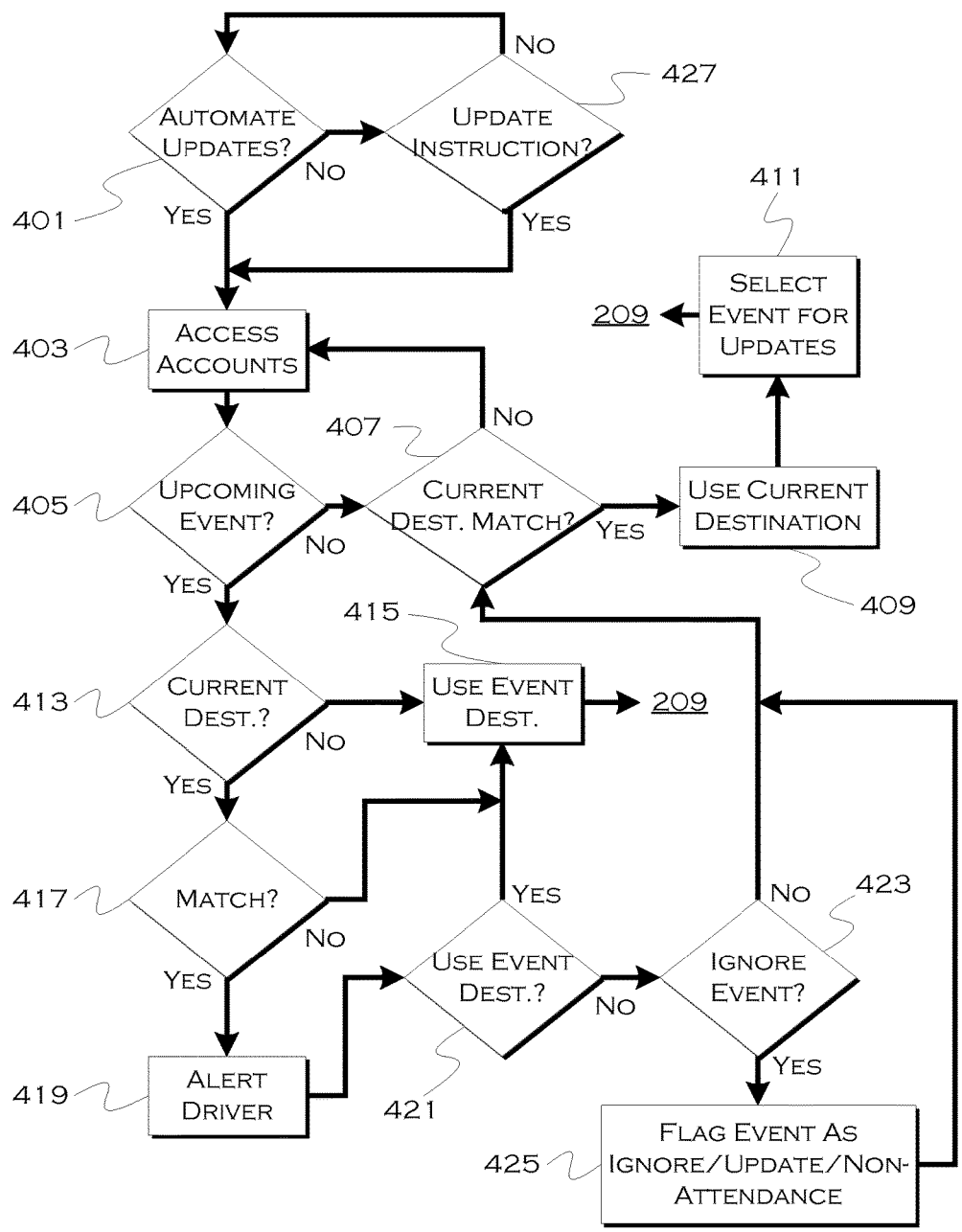
FIG. 4 shows an illustrative event-update process.

FIG. 4 shows an illustrative event-update process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative example shown in FIG. 4, the process provides a user with an option, when connecting to a computer, for example, to select automatic ETA updates 401. This could be an enabled feature of the application, for example, such that when the application is enabled, automatic ETA updates are enabled. In another example, the process waits for a user to manually instruct ETA updates 427 or to enable automatic updates before continuing.

Once the updates have been instructed, the process will access one or more user event-storing accounts. These can include, but are not limited to, mobile device calendars, PC calendars, social media accounts, and any other sources of updateable calendar information. In some examples, even if the event itself is not updateable, there may be a way to contact one or more other participants, which can be considered "updateable" for the purpose of inclusion. Or, for example, if an updateable account exists, and event from a non-updateable source may be included, and updates of an ETA may be alternatively posted to the updateable account. E.g., a person receives an EVITE invitation but cannot update an expected arrival time on EVITE. Instead, the process may elect to update FACEBOOK with the expected arrival time for the EVITE event. The event planner can know or be told to check FACEBOOK for updates.

For the accessed accounts, the process will identify upcoming events 405. More detail with respect to a non-limiting event identification process is provided with respect to FIG. 5. In this example, if any events meet the criteria for an "upcoming event" 405, the process checks to see if a current vehicle destination exists 413.

If there is no current destination, the process may assume that the most temporally proximate (i.e., next upcoming) event is the intended destination 415. In this example, only events within a tunable event window are selected as upcoming. For example, any event on that calendar date may be considered "upcoming," but it is less likely that a user is in a vehicle on Monday with the intent to travel to an event that begins on Friday. The threshold for "upcoming" events can be user selectable or can be predefined. In some instances, it may vary by event. For example, the threshold may include any event that can be reached less than 2 hours ahead of a scheduled start time. So, for example, if a user had three events on Monday at noon, one that was twenty minutes away and started at 4 PM, one that was forty minutes away and started at 1 PM, and one that was four days travel away and started at noon on Friday, then the second and third events might be included (because the ETA for those events based on the present time is within two hours of event start, even though the Friday event is still four days away, it would take four days of driving to get there). The 4 PM Monday event might not be included in the "upcoming" events until after 1:40 PM, based on the exemplary, non-limiting parameters used in this example. In other examples, the user can instruct inclusion of all events on a given data, all events within a certain time frame, or just allow predefined system parameters to determine which events should be considered.

If there is a current destination already input into the vehicle, the process may check to see if the current destination matches any of the events (upcoming or otherwise). For example, using the three events described above, the system may recognize that the input destination actually corresponds to the 4 PM Monday event 417. In this example, if the destination matched an event within the "upcoming event" category, the system might use that destination as the event for which updates are provided 415. So, for example, if the "upcoming events" included the 4 PM event based on the definition of upcoming events, the process might use the 4 PM event because it matched a current vehicle destination. Because there is an intervening event (the 1 PM event), the system may also ask the driver if updates should alternatively or additionally be provided for the more proximate event.

If the current destination does not match any of the upcoming events, the process may alert the driver that, based on the destination, it looks like the driver may not be traveling to the event 419. So, in this example, since the 4 PM event was not included in the "upcoming event" model, there would not be a match of the present destination (the 4 PM event) with any of the defined upcoming events. Since destinations can be set for a variety of reasons, the driver may want a different navigation destination than the event destination, because the driver already knows how to travel to the event. So, for example, in this instance, the driver has the option of instructing the ETA update process to use the event destination as the ETA update destination 421, even though the actual navigation destination is different. For example, the driver could instruct the system to process ETA updates for the 1 PM event, even though the navigation system was set for the location of the 4 PM event.

If the driver elects not to use any of the upcoming event destinations as ETA update destinations, then the process may assume that the driver may not be attending those destinations. Of course, it may also be the case that the driver simply doesn't want or care about ETA updates to those destinations. Accordingly, in this example, the process asks the driver if the driver will still be attending the event 423. If the driver does not wish to ignore the event, no further action will be taken with respect to that event unless explicitly instructed (because the driver, at this point in the process, indicated no ETA updates for that event, but also that the event would not be ignored). Instead, the process now checks a current destination against non-upcoming events. In this example, since the current destination corresponds to the event (4 PM event) classified as non-upcoming, there would be a match between destination and event location 407, and the process could use the current destination 409 as the basis for event updates 411.

If there was no match (i.e., if the current destination did not match the 4 PM event location), the process could continue to check accounts until, for example, the 4 PM event was classified as an "upcoming event" and thus was explicitly identified to the driver as a possible candidate for ETA update 421.

If the driver elects to "ignore" a certain upcoming event, indicating, for example, non-attendance, the process may also update the driver's attendance status for that event as "not attending" 425. This can help exempt the event from future consideration in ETA update cycles.

Figure 5:
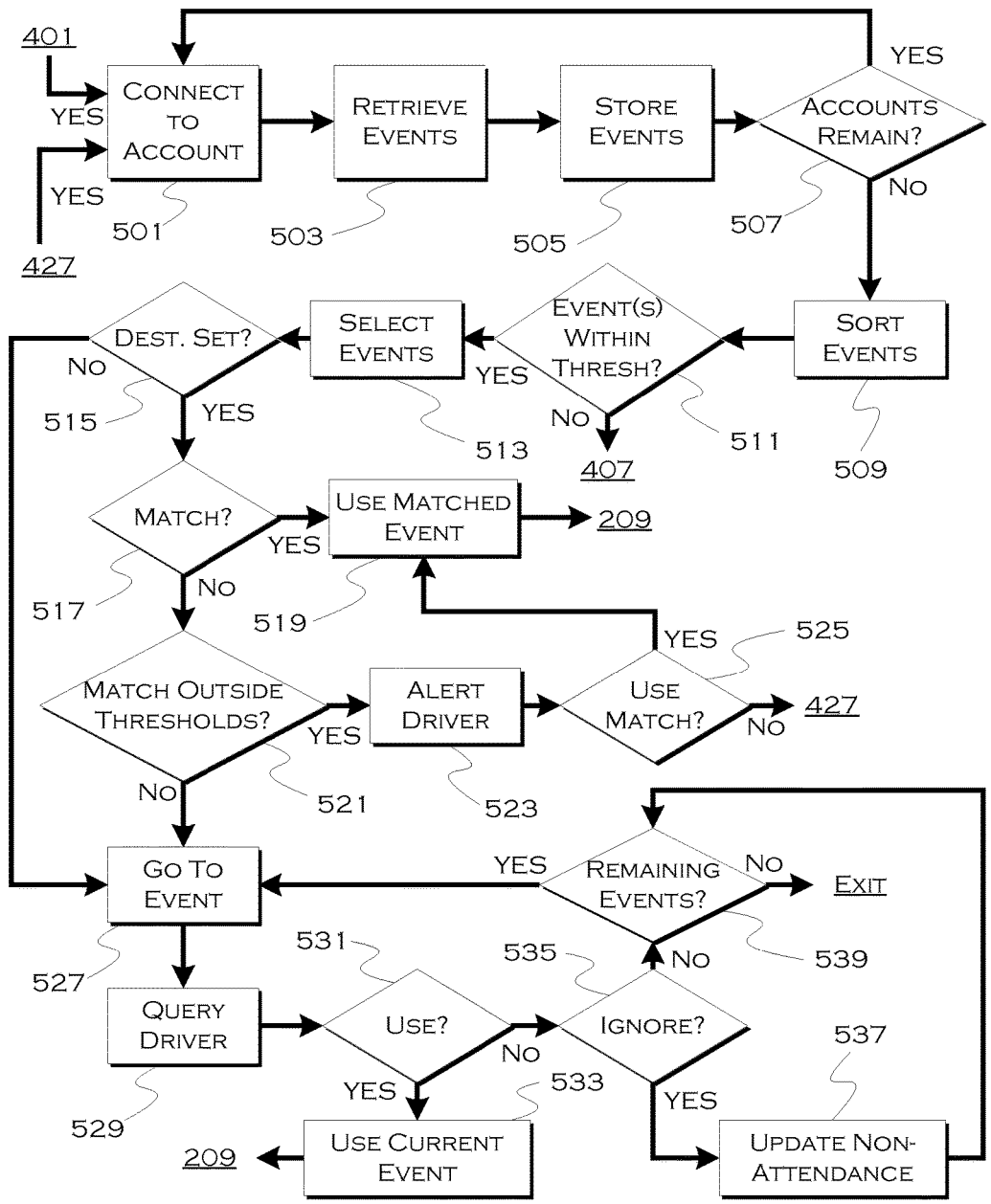
FIG. 5 shows an illustrative event-selection process.

FIG. 5 shows an illustrative event-selection process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process will identify "upcoming" events from events posted to various accounts to which the process has access. The user can preconfigure the application with access rights to certain accounts, from which event information can be drawn and/or to which ETA information can be updated. These include, but are not limited to, calendar accounts, social media accounts, email accounts, text messaging accounts, etc. Some accounts may not be usable by some processes for event information retrieval (i.e., text may only be usable if the process can extract upcoming events from text), but those accounts may still be usable for updates and may be designated as "update only" accounts.

In this example, the process accesses at least one account from which event information can be obtained 501. Since the event is accessed in order to provide an ETA, some identification of the event location will be needed, either included with the event, determinable from the event name (e.g., a professional football game with team name can be used to determine the location as the stadium), or user-input, for example. In this example, all events scheduled are retrieved from the accessed account 503 and locally stored

505. This could be, for example, all events in a given day, week, month, or other time period. If additional accounts remain 507, the process is repeated for the additional event-information-providing accounts.

Once the events have been locally stored, the process may sort all the events by start time 509 to obtain an ordered list of upcoming events. If an "upcoming event" window is defined (e.g., 2 hours), the process will determine which of the events, if any 511, fall within the threshold window as "upcoming" 513. If no events fall within the window 513, the process may resort to alternative event determination, such as illustratively shown in FIG. 4, starting at element 407.

Once the "upcoming events" have been determined, the process checks to see if a navigation destination is set 515. In this example, at this point in the process, there is at least one event determined as meeting the criteria for "upcoming." If a destination is set, the process will check for a match between the destination and any of the upcoming events 517. If a match is found, at least that event will be provided with ETA updates 519. As previously noted, the driver could also be given the option to provide updates to other upcoming events, wherein the updates would update an arrival time based on, for example, the current driver location and a route from that location to the other events. Alternatively, if the other events were later than the selected event, the ETA update process could update those ETAs based on the end time of the currently utilized event+a travel time from that event to the next event(s).

If there is no match between the current destination and any of the upcoming events, the process may check for a match between the current destination and one of the downloaded events outside the "upcoming event" threshold 521. If there is a match, the process may alert the driver 523 and ask the driver if this event (the matching event) should be used as the ETA update event. If so, the process will use that event for ETA updates. If the driver doesn't wish to update an ETA for this event at this time (perhaps, for example, because the event is still a number of hours off), the process may proceed to present the identified upcoming events to the driver one at a time for determination of which event(s) to use for ETA updates.

Although in the examples only a single event may have an ETA updated, it is quite possible to update the ETAs for multiple events based on, for example, without limitation, current driver location and time to each event from that location, end time of previous events+travel time from those events to next events, or any other suitable factors.

In this example, the process presents the most temporally (or physically) proximate event as a next event 527 and asks the driver if this event should be used for ETA updates 529. If the driver confirms use of this event 531, the process can provide updates for this event 533. If the driver declines to use this event, the process can ask the driver if the event will be ignored 535 (i.e., non-attended). If so, the process can update the driver's ETA as "not attending" 537. If any events remain 539, the process will move to a next most temporally (or physically) proximate event and repeat, until no events remain or an event is selected. If no event is selected, the process may exit or wait for a later time until appropriate event selection conditions are met.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a processor configured to:
    receive vehicle information including location and fuel level;
    determine a current estimated time-of-arrival (ETA) to a destination based on travel time from the location;
    determine a fuel-level impact on the current ETA; and
    provide a remote-party update, including the current ETA, responsive to the current ETA deviating from a previous ETA by at least a threshold deviance that varies with temporal proximity, such that the shorter the ETA, the lower the deviance.

2. The system of claim 1, wherein the processor is configured to:
    access a user event-providing account;
    retrieve an event from the accessed account; and
    determine the destination with respect to the retrieved event.

3. The system of claim 2, wherein the destination is determined based on retrieval of an event address from the user event-providing account.

4. The system of claim 2, wherein the destination is determined based on event information.

5. The system of claim 1, wherein the destination is determined based on user input.

6. The system of claim 2, wherein the processor is further configured to update the event-providing account with the current ETA to provide the remote update.

7. The system of claim 6, wherein the event-providing account includes a calendar account and the updating includes updating a user calendar with the current ETA.

8. The system of claim 6, wherein the event-providing account includes a social media account and the updating include posting the current ETA to the social media account.

9. The system of claim 1, wherein the processor is configured to send a notification directly to an event attendee, via text, other than a current vehicle driver to provide the remote-party update.

10. The system of claim 1, wherein the processor is configured to:
    estimate a fuel amount remaining at the destination;
    compare the remaining estimated fuel amount to a threshold minimum; and
    determine the fuel-level impact as including an estimated refueling time based on the estimated fuel amount remaining being below the threshold minimum, such that the impact includes refueling time even if the driver is projected to have sufficient fuel to reach the destination.

11. A computer-implemented method comprising:
    receiving vehicle information including location and fuel level;
    determining a current estimated time-of-arrival (ETA) to a destination based on travel time from the location;
    providing a remote party update, including the current ETA, responsive to deviance of the current ETA from a previous ETA exceeding a deviance threshold, the deviance threshold determined based on a message type chosen for providing the remote party update.

12. The method of claim 11, further comprising:
    accessing a user event-providing account;
    retrieving an event from the accessed account; and determining the destination with respect to the retrieved event.

13. The method of claim 12, wherein the destination is determined based on retrieval of an event address from the user account.

14. The method of claim 12, wherein the destination is determined based on event information.

15. The method of claim 12, wherein the destination is determined based on user input.

16. The method of claim 12, wherein providing the remote update further includes updating the event-providing account with the current ETA, wherein the deviance threshold for providing the remote update via updating the account is lower than the deviance threshold for providing the remote update via direct messaging, including text or email.

17. The method of claim 16, wherein the event-providing account includes a calendar account or social media account.

18. The method of claim 12, wherein providing the remote update further includes sending a direct text or email to a predesignated user, wherein the deviance threshold for providing the remote update via text or email is higher than the deviance threshold for providing the remote update via an event-providing account update.

19. The method of claim 11, wherein determining the deviance threshold further comprises:
    determining the deviance threshold based on a message type, wherein deviance thresholds for providing the remote update via direct messaging to a user via text or email are higher than a deviance threshold for providing the remote update via updating a calendar account.

* * * * *